(12) United States Patent
Okutsu et al.

(10) Patent No.: US 8,049,844 B2
(45) Date of Patent: Nov. 1, 2011

(54) COLOR FILTER AND LIQUID CRYSTAL DISPLAY DEVICE

(75) Inventors: Satoshi Okutsu, Tokyo (JP); Kenro Sunahara, Tokyo (JP); Atsushi Nishida, Tokyo (JP); Yukino Miyagawa, Tokyo (JP); Tomoyuki Kadowaki, Tokyo (JP); Mie Shimizu, Tokyo (JP); Takeshi Itoi, Tokyo (JP); Koichi Minato, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 489 days.

(21) Appl. No.: 12/201,531

(22) Filed: Aug. 29, 2008

(65) Prior Publication Data

US 2009/0002858 A1 Jan. 1, 2009

Related U.S. Application Data

(63) Continuation of application No. PCT/JP2007/053872, filed on Mar. 1, 2007.

(30) Foreign Application Priority Data

Mar. 1, 2006 (JP) ................................. 2006-055604

(51) Int. Cl.
*G02F 1/1333* (2006.01)
(52) U.S. Cl. ........................ 349/106; 349/107; 349/108
(58) Field of Classification Search ........... 349/106–108
See application file for complete search history.

(56) References Cited

U.S. PATENT DOCUMENTS

| 2004/0105265 A1 | 6/2004 | Takizawa |
| 2006/0183037 A1 | 8/2006 | Takizawa |

FOREIGN PATENT DOCUMENTS

| JP | 2002-229054 | 8/2002 |
| JP | 2004-085592 | 3/2004 |
| JP | 2004-145275 | 5/2004 |
| JP | 2004-177592 | 6/2004 |
| JP | 2006-47975 | 2/2006 |
| TW | 200307891 A | 12/2003 |

OTHER PUBLICATIONS

Machine translation of Japanese publication 2006047975 Feb. 16, 2006.*
International Search Report for PCT/JP2007/053872, mailed May 29, 2007.
Office Action and English translation mailed Jun. 29, 2010 in JP 2008-503803.
Office Action and English translation in Taiwanese patent application 096106955 mailed Jun. 21, 2011.

* cited by examiner

*Primary Examiner* — Phu Vu
(74) *Attorney, Agent, or Firm* — Nixon & Vanderhye P.C.

(57) ABSTRACT

A color filter includes red, green and blue filter segments and is adapted to be used in a liquid crystal display device using, as a light source, a white LED having specified spectral properties. The red filter segment has a 50% transmittance wavelength within a range of 595 to 610 nm and a transmittance of 85% or more at a wavelength of 630 nm. The blue filter segment has a maximum transmittance wavelength of 455 nm or less and a transmittance of 55% or more at a wavelength of 450 nm. A thickness of each of the red, green and blue filter segments is 3.0 μm or less. A liquid crystal display device including this color filter and the white LED is also disclosed.

6 Claims, 2 Drawing Sheets

COLOR FILTER AND LIQUID CRYSTAL DISPLAY DEVICE

CROSS REFERENCE TO RELATED APPLICATIONS

This is a Continuation Application of PCT Application No. PCT/JP2007/053872, filed Mar. 1, 2007, which was published under PCT Article 21(2) in Japanese.

This application is based upon and claims the benefit of priority from prior Japanese Patent Application No. 2006-055604, filed Mar. 1, 2006, the entire contents of which are incorporated herein by reference.

BACKGROUND OF THE INVENTION

1. Field of the Invention

The present invention relates to a color filter used, for example, in a color liquid crystal display device and a liquid crystal display device provided with the same.

2. Description of the Related Art

In recent years, a color liquid crystal display device has been used in various applications such as a monitor for personal computers (PCs), a display for cell phones, laptop PCs and personal digital assistants, because of advantages such as lower power consumption and space saving, and has also been used in liquid crystal televisions in recent years as substitutes for conventional CRT-based televisions.

Color reproducibility is considered important in liquid crystal televisions.

The color reproducibility of a color liquid crystal display device is determined by the colors of lights emitted from red, green and blue filter segments constituting a color filter and is evaluated on the basis of the area of a triangle (color reproducing area, hereinafter "area A") defined by three chromaticity points of red, green and blue filter segments expressed as (xR, yR), (xG, yG) and (xB, yB) on the x-y chromaticity diagram.

Specifically, this color reproducibility is expressed as the ratio of the area A to the area of a triangle (area B) defined by 3 points of red (0.67, 0.33), green (0.21, 0.71) and blue (0.14, 0.08) that are the three primary colors in the standard system prescribed by U.S. National Television System Committee (NTSC) (hereinafter referred to as NTSC ratio. The unit is % ((area A/area B)×100 (%)). The NTSC ratio is about 40 to 50% for general laptop computers, about 50 to 60% for PC monitors and about 72% for liquid crystal televisions.

The NTSC ratio increases as the color purity of each filter segment is increased.

However, as the color purity of the filter segment is increased, the light utilization efficiency of a backlight (represented by the lightness Y value) is decreased. Therefore, high electric power is required in order to increase the Y value while maintaining high color purity.

Among conventional color liquid crystal display devices, products powered mainly with a battery, such as personal digital assistants and cell phones, do not use high electric power because of an emphasis on power consumption, and thus the NTSC ratio thereof is as low as 30 to 50%.

However, as the opportunity of watching photos and TV programs on personal digital assistants and on displays of cell phones is increasing in recent years, there is increasing demand not only for lower power consumption but also for a higher NTSC ratio even in personal digital assistants and displays of cell phones.

A backlight using a cold-cathode tube as a light source is used in laptop PCs, monitors and liquid crystal televisions, while a front light or backlight using, as a light source, a white LED formed by coating the surface of a blue LED chip of lower power consumption with a layer of a phosphor which converts a blue light into a yellow light is often used in displays of products powered mainly with a battery, such as personal digital assistants and cell phones.

In the white LED, a part of the blue light emitted by blue LED passes through the phosphor layer, and the remainder is absorbed by the phosphor and converted into a yellow color. A mixed light of the two color lights of blue and yellow is recognized as white light by an observer.

That is, the light from this white LED is a mixed light of blue and yellow lights and is different in wavelength and spectrum peak from the backlight from a cold-cathode tube as a light source.

It follows that when the white LED is used, a filter segment having different spectroscopic properties from those of a filter segment used with a cold-cathode tube backlight is necessary in improving color reproducibility.

Techniques of improving color reproducibility where white LED is used are disclosed in Jpn. Pat. Appln. KOKAI Publication No. 2004-177592 for a green filter segment and in Jpn. Pat. Appln. KOKAI Publication No. 2004-145275 for a red filter segment.

However, not only the color reproducibility of red, green and blue colors, but also the color reproducibility and lightness (Y value) of white color are important in the color liquid crystal device.

The color reproducibility and lightness (Y value) of white color cannot be improved by merely improving the color reproducibility of green and red filter segments as described in Jpn. Pat. Appln. KOKAI Publication Nos. 2004-177592 and 2004-145275 supra.

Particularly, because the red wavelength light intensity from white LED is lower than the green wavelength light intensity and blue wavelength light intensity from the LED, the red segment unlike the green segment and blue segment should not only shield a transmitted light at a wavelength higher or lower than a predetermined wavelength, but also transmit a red wavelength light with good balance.

The blue segment should shield or transmit a light in a specific wavelength range, corresponding to the characteristics of the red segment.

BRIEF SUMMARY OF THE INVENTION

Accordingly, an object of the present invention is to provide a color filter with red, green and blue color reproducibility, white color reproducibility, color temperature and lightness (Y value) optimized even in a liquid crystal display device using, as a light source, a white LED formed by coating the surface of a blue LED with a phosphor.

Another object of the present invention is to provide a color liquid crystal display device using a white LED as a light source, which is excellent in red, green and blue color reproducibility and also in white color reproducibility.

According to a first aspect of the invention, there is provided a color filter adapted to be used in a liquid crystal display device using, as a light source, a white LED having spectral properties such that it has a wavelength ($\lambda 1$) at which an emission intensity becomes the highest, within a wavelength range of 430 nm to 485 nm and also has a peak wavelength ($\lambda 2$) of a second emission intensity within a wavelength range of 530 nm to 580 nm, and a ratio (I2/I1) of an emission intensity I2 at the wavelength $\lambda 2$ to an emission intensity I1 at the wavelength $\lambda 1$ is 0.2 or more, but 0.7 or less, the color filter comprising a red filter segment, a green filter segment and a blue filter segment, on a substrate, wherein the red filter segment has a 50% transmittance wavelength within a range of 595 to 610 nm and a transmittance of 85% or more at a wavelength of 630 nm, the blue filter segment has a maximum transmittance wavelength of 455 nm or less and a transmittance of 55% or more at a wavelength of 450 nm, and a thickness of each of the red filter segment, the green filter segment and the blue filter segment is 3.0 µm or less.

According to a second aspect of the invention, there is provided a liquid crystal display device comprising the color filter of the present invention and a white LED having spectral properties such that it has a wavelength (λ1) at which an emission intensity becomes the highest, within a wavelength range of 430 nm to 485 nm and also has a peak wavelength (λ2) of a second emission intensity within a wavelength range of 530 nm to 580 nm, and a ratio (I2/I1) of an emission intensity I2 at the wavelength λ2 to an emission intensity I1 at the wavelength λ1 is 0.2 or more, but 0.7 or less.

DETAILED DESCRIPTION OF THE INVENTION

First, the color filter of the present invention will be described.

The color filter of the present invention has a red filter segment, a green filter segment and a blue filter segment, on a substrate.

When used in a liquid crystal display device using, as a light source, a white LED (hereinafter referred to as "specified white LED") having spectral properties such that it has a wavelength (λ1) at which an emission intensity becomes the highest, within a wavelength range of 430 nm to 485 nm and also has a peak wavelength (λ2) of a second emission intensity within a wavelength range of 530 nm to 580 nm, and a ratio (I2/I1) of an emission intensity I2 at the wavelength λ2 to an emission intensity I1 at the wavelength λ1 is 0.2 or more, but 0.7 or less, the red filter segment has a 50% transmittance wavelength within a range of 595 to 610 nm and a transmittance of 85% or more at a wavelength of 630 nm, and the blue filter segment has a maximum transmittance wavelength of 455 nm or less and a transmittance of 55% or more at a wavelength of 450 nm. The thickness of each of the red filter segment, the green filter segment and the blue filter segment is 3.0 μm or less.

Preferably, the color filter of the present invention shows an NTSC ratio of 72% or more and a color temperature of 7000 K or more.

The NTSC ratio is a value indicative of the size of a color reproducing area as seen from the above definition, and to enlarge the color reproducing area, the NTSC ratio should be 72% or more that is the color reproduction range of television. When the NTSC ratio is less than 72%, the color reproducing area is narrow, and thus the color reproducibility is inferior. A higher NTSC ratio brings about a broader color reproducing area and is thus preferable, but because the NTSC ratio and the lightness of white color are in the trade-off relationship, the NTSC ratio is preferably 100% or less.

Color temperature is a value indicative of the hue of white color. As color temperature is decreased, white becomes yellowish, while as color temperature is increased, white becomes bluish. The desired value of color temperature at which natural white appears is 6500 K at which CIE daylight is generated. However, color temperature is decreased upon passage through a polarizer essential for the liquid crystal display device, so the color temperature should be 7000 K or more and is particularly desirably 7500 K or more.

As the color temperature is increased, the white hue seems more bluish, but the color temperature is desirably 25000 K or less seen in the blue-sky light on a clear day.

As the film thickness of the red, green or blue filter segment is increased, the color reproducing area can be broadened, but a thick film requires a long time in drying and also requires a long time in development, thus resulting in deterioration in productivity. Hence, the film thickness of each filter segment is 3.0 μm or less, preferably 2.3 μm or less. The film thickness of each of the red, green and blue filter segments is usually 0.5 μm or more.

Each of the red, green and blue filter segments constituting the color filter of the present invention is formed by using a colored composition containing a pigment carrier consisting of a transparent resin, its precursor or a mixture thereof, a pigment, and if necessary an organic solvent.

Figure 1:
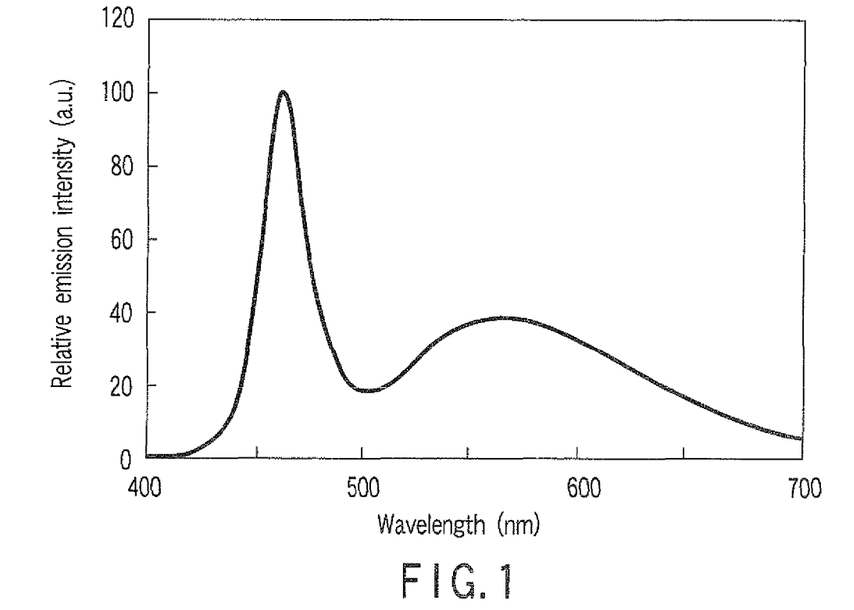
FIG. 1 is an emission spectrum of a pseudo-white LED (trade name: NSPW 300BS) manufactured by Nichia Corporation.

The specified white LED is commercially available and can be obtained under the trade name NSPW 300BS from Nichia Corporation, Japan. FIG. 1 shows spectral characteristics of white LED NSPW 300BS manufactured by Nichia Corporation.

Figure 2:
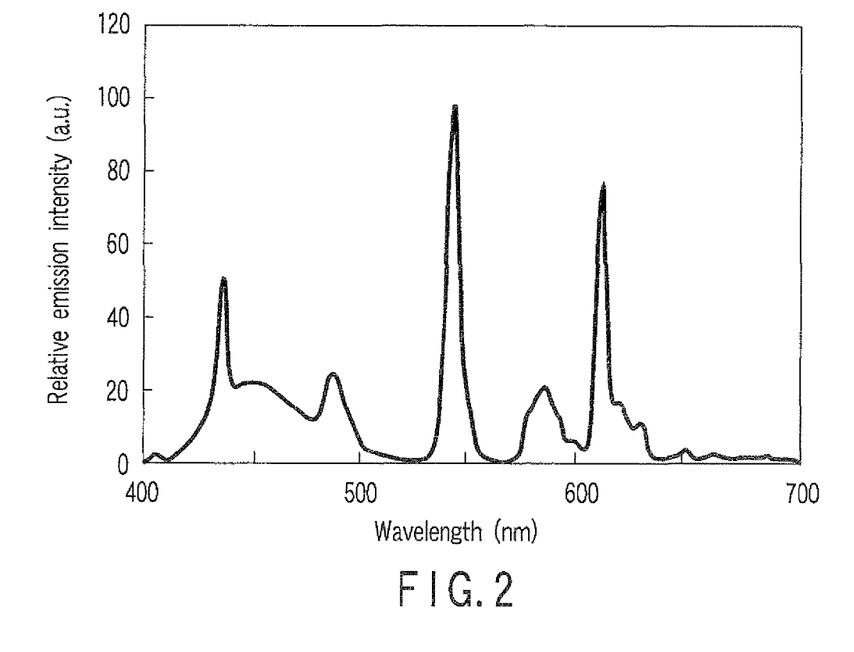
FIG. 2 is an emission spectrum of a typical cold-cathode tube.

FIG. 2 shows spectral characteristics of a typical cold-cathode tube. In FIGS. 1 and 2, relative emission intensity is expressed in arbitrary unit (a.u.) on the ordinate.

As can be seen from FIGS. 1 and 2, the specified white LED and the cold-cathode tube are significantly different in spectral characteristics. Accordingly, when the specified white LED is used as a light source, an NTSC ratio of 72% or more cannot be achieved by using a color filter having the same spectral characteristics as those of the conventional color filter for a cold-cathode tube.

Even when the specified white LED having spectral characteristics as shown in FIG. 1 is used as a light source, it is necessary that the red filter segment has a 50% transmittance wavelength within the range of 595 to 610 nm and a transmittance of 85% or more at a wavelength of 630 nm and the blue filter segment has a maximum transmittance wavelength of 455 nm or less and a transmittance of 55% or more at a wavelength of 450 nm in order to optimize the red, green and blue color reproducibility, as well as white color reproducibility, color temperature, and lightness (Y value).

Specific constitutions of the red, green and blue filter segments having the spectral characteristics noted above, and red, green and blue colored compositions for forming these filter segments will be described in detail below.

<Pigment for The Green Filter Segment (or The Green Colored Composition)>

In the spectral characteristics of the specified white LED, there is no absorption maximum in the vicinity of 500 nm to 550 nm corresponding to green hue wavelengths. Accordingly, the spectroscopic spectrum of the green filter segment should be narrowed to attain an NTSC ratio of 72% or more.

In the green filter segment, green pigments such as C.I. Pigment Green 7, 10, 36, 37, etc. can be used, and a yellow pigment can be concomitantly used.

The yellow pigment includes C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 198, 213, 214, etc.

The green filter segment desirably contains at least 3 pigments selected from C.I. Pigment Green 36, C.I. Pigment Green 7, C.I. Pigment Yellow 150 and C.I. Pigment Green 185, at least one of which is a green pigment, in order to attain higher white lightness (Y value) than by a green filter segment containing one green pigment and one yellow pigment and to make the green filter segment 3.0 μm or less in film thickness, preferably 2.3 μm or less.

The combination of at least 3 pigments contained in the green filter segment includes a combination of the following 3 pigments: C.I. Pigment Green 36, C.I. Pigment Green 7 and C.I. Pigment Yellow 150 (preferably in a ratio by weight of 20-80/15-75/5-65); C.I. Pigment Green 36, C.I. Pigment Green 7 and C.I. Pigment Yellow 185 (preferably in a ratio by weight of 20-80/15-75/5-65); and C.I. Pigment Green 36, C.I. Pigment Yellow 150 and C.I. Pigment Yellow 185 (preferably in a ratio by weight of 40-90/15-55/5-55). Particularly, the green filter segment desirably contains all of the 4 pigments that are C.I. Pigment Green 36, C.I. Pigment Green 7, C.I. Pigment Yellow 150 and C.I. Pigment Yellow 185, in order to attain the highest white lightness (Y value). C.I. Pigment Green 36, C.I. Pigment Green 7, C.I. Pigment Yellow 150 and C.I. Pigment Yellow 185 are preferably blended in a ratio by weight of 20-80/5-70/5-70/5-70.

<Pigment for the Red Filter Segment (or the Red Colored Composition)>

Red pigments such as C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 and 279 can be used in the red filter segment.

The red filter segment desirably contains at least two pigments selected from C.I. Pigment Red 254, C.I. Pigment Red 177 and C.I. Pigment Red 179. A combination of C.I. Pigment Red 254 and C.I. Pigment Red 177 (preferably in a ratio by weight of 10-90/10-90) or a combination of C.I. Pigment Red 177 and C.I. Pigment Red 179 (preferably in a ratio by weight of 10-90/10-90) is most desirable because the color temperature can be increased and the white lightness (Y value) can also be increased.

When only C.I. Pigment Red 254 is used, the color temperature is decreased. When only C.I. Pigment Red 177 or only C.I. Pigment Red 179 is used, the white lightness (Y value) is decreased.

<Pigment for the Blue Filter Segment (or the Blue Colored Composition)>

Blue pigments such as C.I. Pigment Blue 15, 15:1, 15:2, 15:3, 15:4, 15:6, 16, 22, 60, 64, etc can be used in the blue filter segment, and the blue pigment can be used in combination with a violet pigment such as C.I. Pigment Violet 23 etc.

The blue filter segment desirably contains C.I. Pigment Blue 15:6 and C.I. Pigment Violet 23 wherein the C.I. Pigment Blue 15:6/C.I. Pigment Violet 23 ratio by weight is preferably 85/15 to 40/60, in order that the white lightness (Y value) can be Increased and the color temperature can also be increased. The C.I. Pigment Blue 15:6/C.I. Pigment Violet 23 ratio by weight is preferably 80/20 to 50/50.

When the C.I. Pigment Blue 15:6/C.I. Pigment Violet 23 ratio by weight is 100/0 to 85/15, the blue filter segment is made 2.3 µm or more in film thickness. When the C.I. Pigment Blue 15:6/C.I. Pigment Violet 23 ratio by weight is 40/60 to 0/100, the lightness of the blue filter segment is decreased, and the white color temperature is decreased.

When the specified white LED is used as a light source, a green filter segment containing 3 pigments that are C.I. Pigment Green 36, C.I. Pigment Green 7 and C.I. Pigment Yellow 150, 3 pigments that are C.I. Pigment Green 36, C.I. Pigment Green 7 and C.I. Pigment Yellow 185, 3 pigments that are C.I. Pigment Green 36, C.I. Pigment Yellow 150 and C.I. Pigment Yellow 185, or 4 pigments that are C.I. Pigment Green 36, C.I. Pigment Green 7, C.I. Pigment Yellow 150 and C.I. Pigment Yellow 185, a red filter segment containing 2 pigments that are C.I. Pigment Red 254 and C.I. Pigment Red 177 or 2 pigments that are C.I. Pigment Red 177 and C.I. Pigment Red 179, and a blue filter segment containing C.I. Pigment Blue 15:6 and C.I. Pigment Violet 23 in a ratio of from 85/15 to 40/60 by weight are desirably combined to constitute a color filter so that even if the respective color filter segments are thin in film thickness, the NTSC ratio reaches 72% or more, the white color temperature reaches 7000 K or more, and the white lightness (Y value) is increased.

Preferably, the pigment is finely pulverized by kneading a mixture containing the pigment in question, a water-soluble inorganic salt, and a water-soluble organic solvent which substantially does not dissolve the water-soluble inorganic salt (this step is hereinafter referred to as salt milling), and then removing the water-soluble inorganic salt and water-soluble organic solvent.

When the finely pulverized pigment is used, the spectral transmittance of a filter segment is enhanced. During the salt milling, a basic group-containing derivative, a resin which is at least partially soluble in the water-soluble organic solvent or a dispersant may be additionally used. When the finely pulverized pigment obtained by these treatments is used, a filter segment with further improvement in optical properties can be formed.

<Pigment Carrier>

The pigment carrier contained in each colored composition is composed of a transparent resin, its precursor or a mixture thereof to provide a resinous binder for each filter segment to be formed.

The transparent resin preferably has a light transmittance of 80% or more, more preferably 95% or more, in the entire wavelength region of 400 to 700 nm in the visible light region.

The transparent resin includes a thermoplastic resin, a thermosetting resin and an active energy-curable resin, and a precursor of the transparent resin includes monomers or oligomers to be cured with radiation of active energy to form a transparent resin. These can be used singly or as a mixture of two or more thereof.

Examples of the thermoplastic resin include a butyral resin, a styrene-maleic acid copolymer, chlorinated polyethylene, chlorinated polypropylene, polyvinyl chloride, a vinyl chloride-vinyl acetate copolymer, polyvinyl acetate, a polyurethane resin, a polyester resin, an acrylic resin, an alkyd resin, polystyrene, a polyamide resin, a rubber-based resin, a cyclized rubber-based resin, a cellulose derivative, polyethylene, polybutadiene, and a polyimide resin. Examples of the thermosetting resin include an epoxy resin, a benzoguanamine resin, a rosin-modified maleic acid resin, a rosin-modified fumaric acid resin, a melamine resin, a urea resin, and a phenolic resin.

As the active energy-curable resin, use may be made of a resin prepared by allowing a linear polymer having a reactive substituent such as a hydroxyl group, a carboxyl group or an amino group to react with a (meth)acrylic compound having a reactive substituent such as an isocyanate group, an aldehyde group or an epoxy group, or with cinnamic acid, to introduce photocrosslinkable groups such as (meth)acryloyl group or styryl group into the linear polymer. The photosensitive resin that can be used in the invention also includes a half-esterified compound prepared by allowing a liner polymer containing an acid anhydride such as a styrene-maleic anhydride copolymer or an α-olefin-maleic anhydride to be half-esterified with a (meth)acrylic compound containing a hydroxyl group, such as hyrdoxyalkyl(meth)acrylate.

The monomer or oligomer as a precursor of the transparent resin includes various acrylates and methacrylates such as methyl(meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, polyethyleneglycol di(meth)acrylate, 1,6-hexanediol di(meth)acrylate, triethyleneglycol di(meth)acrylate, tripropyleneglycol di(meth)acrylate, trimethylolpropane tri(meth)acrylate, pentaerythritol tri(meth)acrylate, 1,6-hexanediol diglycidylether di(meth)acrylate, bisphenol A diglycidylether di(meth)acrylate, neopentylglycol diglycidylether di(meth)acrylate, dipentaerythritol hexa(meth)acrylate, tricyclodecanyl(meth) acrylate, ester acrylate, (meth)acrylate of methylolated melamine, epoxy(meth)acrylate and urethane acrylate; (meth)acrylic acid, styrene, vinyl acetate, hydroxyethyl vinylether, ethyleneglycol divinylether, pentaerythritol trivinylether, (meth)acrylamide, N-hydroxymethyl(meth)acrylamide, N-vinylformamide and acrylonitrile. These compounds may be used alone or as a mixture of two or more thereof.

The pigment carrier can be used in an amount of preferably 50 to 700 parts by weight, more preferably 100 to 400 parts by weight, based on 100 parts by weight of the total of the pigments.

<Organic Solvent>

To facilitate formation of a filter segment, an organic solvent may be contained in each colored composition so that the pigment can be easily sufficient dispersed in the pigment carrier and applied onto a transparent substrate such as a glass substrate to form a film having a thickness of 3.0 μm or less, preferably 2.3 μm or less, after drying.

Examples of the organic solvent include cyclohexane, isoamyl acetate, propylene glycol monomethyl ether acetate, ethyl 3-ethoxypropionate, propylene glycol diacetate, diethylene glycol dimethyl ether, 1,2,3-trichloropropane, 2-heptane, 4-heptanone, m-xylene, N,N-dimethylformamide, n-butyl alcohol, o-xylene, o-chlorotoluene, ethylene glycol diethyl ether, ethylene glycol monoisopropyl ether, ethylene glycol monoethyl ether, ethylene glycol monoethyl ether acetate, ethylene glycol monopropyl ether, ethylene glycol monoethyl ether, ethylene glycol monomethyl ether acetate, propylene glycol momoethyl ether, propylene glycol monoethyl ether acetate, propylene glycol monopropyl ether, propylene glycol monomethyl ether, methyl isobutyl ketone, n-amyl acetate, n-butyl acetate, isobutyl acetate, tripropylene glycol monobutyl ether, n-propyl acetate, triacetin, propyl acetate, isobutyl alcohol, ethylene glycol monotertiary butyl ether, propylene glycol monomethyl ether propionate, 1,4-dioxane, 3,3,5-trimethylcyclohexanone, cyclohexanol acetate, γ-butyrolactone, tripropylene glycol monomethyl ether, 3-methoxy-3-methyl-1-butanol, 1,3-butanediol, 2-methyl-1,3-butanediol, 2-methyl-1, 3-propanediol, diisobutyl ketone, ethylene glycol monobutyl ether, ethylene glycol monohexyl ether, ethylene glycol monobutyl ether acetate, ethylene glycol dibutyl ether, diethylene glycol monomethyl ether, diethylene glycol diethyl ether, diethylene glycol monoisopropyl ether, propylene glycol monobutyl ether, dipropylene glycol monomethyl ether, dipropylene glycol monoethyl ether, dipropylene glycol monopropyl ether, dipropylene glycol dimethyl ether, 3-methoxybutyl acetate, 3-methoxy-3-methylbutyl acetate, N,N-dimethylacetamide, N-methylpyrrolidone, p-chlorotoluene, o-diethyl benzene, m-diethyl benzene, p-diethyl benzene, o-dichlorobenzene, m-dichlorobenzene, n-butyl benzene, sec-butyl benzene, tert-butyl benzene, cyclohexanol, methyl cyclohexanol, dipropylene glycol monobutyl ether, propylene glycol phenyl ether, dipropylene glycol methyl ether acetate, 1,3-butylene glycol diacetate, diethylene glycol monoethyl ether acetate, diethylene glycol monobutyl ether, diethylene glycol monobutyl ether acetate, 3-methoxy butanol, 1, 3-butylene glycol, 3,3,5-trimethyl-2-cyclohexen-1-one, diacetone alcohol, isophorone, dibasic acid ester, benzyl alcohol, and propylene glycol monomethyl ether propionate. These solvents may be used singly or as a mixture thereof.

The organic solvent can be used in an amount of 800 to 4000 parts by weight, preferably 1000 to 2500 parts by weight, based on 100 parts by weight of the pigment.

<Method for Manufacturing the Colored Composition>

Each colored composition can be prepared by finely dispersing one or more kinds of pigments in the pigment carrier by using a dispersing device such as a three-roll mill, a two-roll mill, a sand mill, a kneader or an attritor.

A colored composition containing two or more kinds of pigments can also be prepared by finely dispersing the respective pigments in the pigment carrier separately and then mixing the respective pigment dispersions. A dispersing aid such as a resin type pigment dispersant, a surfactant or a pigment derivative may be utilized as necessary in dispersing the pigments in the pigment carrier.

Since the dispersing aid is excellent in dispersing pigments and is very effective in preventing the pigments from being re-aggregated subsequent to the initial dispersing thereof, it is possible to create a color filter which is excellent in transparency if a colored composition is used in which the pigments are dispersed in the pigment carrier using the dispersing aid.

When the pigment is dispersed in the pigment carrier, an organic solvent is desirably contained for sufficiently dispersing the pigment in the pigment carrier.

Examples of the surfactant include anionic surfactants such as polyoxyethylene alkylether sulfate, sodium dodecylbenzene sulfate, alkali salts of styrene-acrylate copolymer, sodium alkylnaphthalene sulfonate, sodium alkyldiphenylether disulfonate, monoethanolamine laurylsulfate, triethanolamine laurylsulfate, ammonium laurylsulfate, monoethanolamine stearate, sodium stearate, sodium laurylsulfate, monoethanolamine salt of styrene-acrylic acid copolymer and polyoxyethylene alkylether phosphoric acid ester; nonionic surfactants such as polyoxyethylene oleyl ether, polyoxyethylene lauryl ether, polyoxyethylene nonylphenyl ether, polyoxyethylene alkyl ether phosphoric acid ester, polyoxyethylene sorbitan monostearate and polyethyleneglycol monolaurate; cationic surfactants such as alkyl quaternary ammonium slats and ethyleneoxide adduxts thereof; and amphoteric surfactants such as alkyl betaine such as alkyldimethylamino acetic acid betaine and alkylimidazoline. One of these surfactants may be used alone, or a mixture of a plurality of them may be used.

The surfactant may be used in an amount of usually 50 parts by weight or less, preferably 30 parts by weight or less, based on 100 parts by weight of the pigments in total.

The aforementioned resin type dispersant has a pigment affinity moiety, which has a property to adsorb onto pigments, and a moiety which is compatible with the pigment carrier, and serves to stabilize the dispersion of the pigment in the pigment carrier by adsorption onto the pigment.

Specific examples of the resin type dispersant include a polyurethane, a polycarboxylic acid ester such as a polyacrylate, an unsaturated polyamide, a polycarboxylic acid, a polyamine (partial) carboxylate, an ammonium salt of a polycarboxylic acid, a polyalkylamine carboxylate, a polysiloxane, a long chain polyaminoamide phosphate, a hydroxyl group-containing polycarboxylic acid ester, or modified forms of these polymers, an oily dispersing agent such as amide which is formed by reaction of poly(lower alkyleneimine) with a polyester having a free carboxyl group or a salt thereof; a water-soluble resin or water-soluble polymer such as a (meth)acrylic acid-styrene copolymer, a (meth)acrylic acid-(meth)acrylate copolymer, a styrene-maleic acid copolymer, a polyvinyl alcohol, a polyvinyl pyrrolidine; a polyester, a modified polyacrylate, an ethylene oxide/propylene oxide adduct, and phosphate ester. These materials can be employed singly or in combination of two or more kinds.

The resin type dispersant may be used in an amount of usually 0.1 to 50 parts by weight, preferably 1 to 30 parts by weight, based on 100 parts by weight of the pigments in total.

The pigment derivative refers to a compound having a substituent introduced into an organic pigment, and functions in preventing aggregation of pigments to maintain the pigments in a finely dispersed state.

Examples of the organic pigment include a diketopyrrolopyrrole pigment; an azo pigment such as an azo, diazo or polyazo; a phthalocyanine pigment such as a copper phthalocyanine, a halogenated copper phthalocyanine, a metal-free phthalocyanine; an anthraquinone pigment such as amino anthraquinone, diamino dianthraquinone, anthrapyrimidine, flavanthrone, anthoanthrone, indanthrone, pyranthrone, violanthrone; a quinacridone pigment; a dioxazine pigment; a perinone pigment; a perylene pigment; a thioindigo pigment; an isoindoline pigment; an isoindolinone pigment; a quinophthalone pigment; a thren pigment; and a metal complex pigment.

The pigment derivatives usable in the invention include, for example, those described in Jpn. Pat. Appln. KOKAI Publication No. 63-305173, Jpn. Pat. Appln. KOKOKU Publication Nos. 57-15620, 59-40172, 63-17102 and 5-9469, and these pigment derivatives can be used singly or as a mixture of two or more thereof.

The pigment derivative can be used in an amount of usually 0.1 to 40 parts by weight, preferably 1 to 30 parts by weight, based on 100 parts by the pigments in total.

<Other Additives>

When each colored composition is to be cured by irradiation with ultraviolet rays, a photopolymerization initiator or the like is added to the composition.

Examples of the photopolymerization initiator include acetophenone-based photopolymerization initiators such as 4-phenoxydichloroacetophenone, 4-t-butyl-dichloroacetophenone, diethoxyacetophenone; 1-(4-isopropylphenyl)-2-hydroxy-2-methylpropan-1-one, 1-hydroxycyclohexylphenyl ketone, 2-benzyl-2-dimethylamino-1-(4-morpholinophenyl)-butan-1-one and 2-methyl-1-[4-(methylthio)phenyl]-2-morpholinopropan-1-one; oxime ester-based photopolymerization initiators such as 1-[9-ethyl-6-(2-methylbenzoyl)-9H-carbazol-3-yl]-ethanone-1-o-acyloxime, 1,2-octadiene-1-[4-(phenylthio)-, 2-(O-henzoyloxime]; benzoin-based photopolymerization initiators such as benzoin, benzoin methyl ether, benzoin ethyl ether, benzoin isopropyl ether, and benzyldimethyl ketal; benzophenone-based photopolymerization initiators such as benzophenone, benzoyl benzoic acid, methyl benzoylbenzoate, 4-phenyl benzophenone, hydroxybenzophenone, acrylic benzophenone, and 4-benzoyl-4'-methyldiphenyl sulfide; thioxanthone-based photopolymerization initiators such as thioxanthone, 2-chlorothioxanthone, 2-methylthioxanthone, isopropylthioxanthone, and 2,4-diisopropylthioxanthone; triazine-based photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl-(4'-methoxystyryl)-6-triazine; borate-based photopolymerization initiators; carbazole-based photopolymerization initiators; and imidazole-based photopolymerization initiators. These photopolymerization initiators can be used singly or as a mixture of two or more thereof.

The photopolymerization initiators can be used in an amount of 0.5 to 200 parts by weight, more preferably 20 to 150 parts by weight, based on 100 parts by weight of monomers and/or oligomers that are the precursor of the transparent resin.

The photopolymerization initiator can be used in combination with a sensitizer. Examples of the sensitizer include α-acyloxy ester, acylphosphine oxide, methylphenyl glyoxylate, benzyl, 9,10-phenanthrene quinone, camphor quinine, ethylanthraquinone, 4,4'-diethyl isophthalophenone, 3,3',4,4'-tetra(t-butyl peroxycarbonyl)benzophenone, and 4,4'-diethylaminobenzophenone.

These sensitizers can be used in an amount of 0.1 to 60 parts by weight based on 100 parts by weight of the photopolymerization initiator.

The colored composition may further contain a polyfunctional thiol acting as a chain transfer agent.

The polyfunctional thiol may be a compound having two or more thiol groups. Specific examples of such a compound include hexane dithiol, decane dithiol, 1,4-butanediol bisthiopropionate, 1,4-butanediol bisthioglycolate, ethyleneglycol bisthioglycolate, ethyleneglycol bisthiopropionate, trimethylpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionate tris(2-hydroxyethyl)isocyanulate, 1,4-dimethylmercaptobenzene, 2,4,6-trimercapto-s-triazine, 2-(N,N-dibutylamino)-4,6-dimercapto-s-triazine, etc. These polyfunctional thiols can be employed singly or as a mixture of two more thereof.

The polyfunctional thiol can be used in an amount of 0.1 to 50 parts by weight, preferably 1 to 20 parts by weight, based on 100 parts by weight of the pigments in the colored composition.

The colored composition may contain a storage-stabilizing agent in order to suppress a change with time of viscosity thereof.

Examples of the storage-stabilizing agent include, for example, quaternary ammonium chloride such as benzyltrimethyl chloride or diethylhydroxyamine; an organic acid such as lactic acid, oxalic acid, or methyl ether thereof; t-butylpyrocatechol; an organic phosphine such as triethyl phosphine or triphenyl phosphine; and phosphite.

These storage-stabilizing agents can be used in an amount of 0.1 to 10 parts by weight based on 100 parts by weight of the pigment in the composition.

The colored composition of the present invention may preferably be formulated such that bulky particles of 5 μm or more in size, preferably, bulky particles of 1 μm or more in size, more preferably bulky particles of 0.5 μm or more in size as well as dusts intermingled therein are completely removed from the composition by making use of any suitable means such as centrifugal separation, sintered filter, membrane filter, etc.

<Method for Manufacturing the Color Filter>

The color filter of the present invention is provided, on a transparent substrate or a reflecting substrate, with at least 3 (red, green and blue) filter segments. The filter segments can be formed by printing, ink jetting or photolithography with each of the colored composition.

As for the transparent substrate, it is possible to employ a glass plate made of a material such as a soda-lime glass, low alkali borosilicate glass, alkali-free aluminoborosilicate glass, etc; and a resin plate made of a material such as polycarbonate, poly(methyl methacrylate), polyethylene terephthalate, etc.

For the purpose of driving the liquid crystal after the fabrication of a liquid crystal panel, a transparent electrode consisting of indium oxide, tin oxide, zinc oxide or antimony oxide may be formed on the surface of the glass plate or resin plate.

Since the patterning of these color segments by means of printing method can be performed by simply repeating the printing and drying of a colored composition that has been prepared as various kinds of printing inks, the printing method is advantageous as a manufacturing method of color filter in terms of manufacturing cost and mass production.

Further, due to the recent development of printing technique, it is now possible to perform the printing of very fine pattern which is excellent in dimensional precision as well as in smoothness. In order to perform the printing, the ink may preferably be formulated such that it cannot be dried or solidified on the surface of a printing plate or on a blanket.

Furthermore, it is also important to control the fluidity of ink in a printing machine, so that it may be possible to adjust the viscosity of ink by making use of a dispersant or an extender pigment.

When each of color filter segments is to be formed by means of photolithography method, a colored composition which has been formulated as a solvent development type or alkali development type colored resist material is coated on the surface of a transparent substrate by any desired method of coating such as spray coating, spin coating, slit coating, roll coating, etc., thereby forming a layer having a thickness (as dried) of 0.5 to 3.0 μm, preferably 1.0 to 2.3 μm.

The layer dried as required is then exposed to ultraviolet rays through a mask having a predetermined pattern disposed in contact with or away from this layer.

Subsequently, the resultant film is dipped in, or sprayed with, a solvent or an alkaline developing solution, to remove the uncured portions, thereby forming a desired pattern. These procedures are repeated for forming the pattern of other colors, thus manufacturing a color filter.

Additionally, if required, the coated film may be heated so as to promote the polymerization of the colored resist material. According to this photolithography, it is possible to manufacture a color filter with further improvement in precision as compared with that obtained by the printing method mentioned above.

In performing the development of the colored composition prepared as an alkali development type resist material, an aqueous solution of, e.g., sodium carbonate, or sodium hydroxide, or an organic alkali such as dimethylbenzylamine or triethanolamine may be used as the alkaline developing solution. Further, an anti-foaming agent or a surfactant may be added to the developing solution.

In order to enhance the sensitivity to ultraviolet exposure, a water-soluble or alkali-soluble resin such as polyvinyl alcohol or a water-soluble acrylic resin may be applied onto the colored resist material that has been coated and dried in advance, thereby forming a film capable of minimizing the effects of oxygen obstructing the polymerization. Thereafter, the colored resist material is subjected to ultraviolet exposure.

The color filter of the present invention can be manufactured by means of an electrodeposition method or a transferring method other than the aforementioned methods.

The electrodeposition method is a method wherein by taking advantage of a transparent conductive film formed on the surface of a transparent substrate, each of the color filter segments is electrodeposited on the transparent conductive film through electrophoresis of colloidal particles, thereby manufacturing the color filter.

On the other hand, the transferring method is a method in which each colored filter segment layer is formed in advance on the surface of a releasable transferring base sheet and then this colored filter segment layer is transferred onto a desired substrate.

When a black matrix is formed in advance on a transparent substrate or a light-reflecting substrate prior to the formation of the colored filter segments, the contrast of the liquid crystal display panel can be further enhanced.

The black matrix that can be used herein includes those made of materials which include, but are not limited to, an inorganic film such as chromium, a chromium/chromium oxide multilayer film or titanium nitride and a resin film having a light-shielding agent dispersed therein.

Moreover, a thin film transistor (TFT) may be formed in advance on the transparent substrate or the light-reflecting substrate noted above, and then the colored filter segments are formed.

When the colored filter segments are formed on the TFT substrate, the aperture ratio of liquid crystal display panel can be enhanced, and the lightness can be improved.

As required, an overcoat film, a columnar spacer, a transparent conductive film, a liquid crystal alignment film, etc. may be formed on the color filter of the present invention.

The liquid crystal display device comprising the color filter of the present invention will be described below.

The liquid crystal display device of the present invention is provided with the color filter of the present invention and a light source consisting of the specified white LED.

Figure 3:
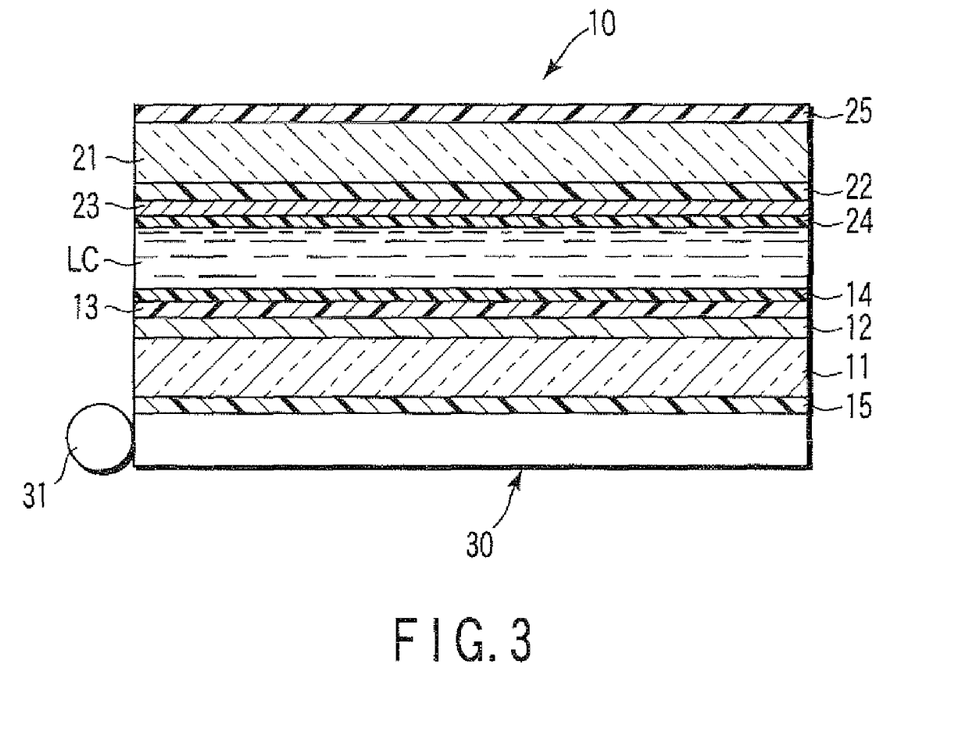
FIG. 3 shows one example of a liquid crystal display device provided with the color filter of the present invention.

FIG. 3 is a schematic cross section of a liquid crystal display device 10 comprising the color filter of the present invention.

The device 10 shown in FIG. 3 comprises a pair of transparent substrates 11 and 21 opposedly disposed with a space between them, and a liquid crystal (LC) is sealed in the space between the substrates.

The liquid crystal (LC) may be oriented according to addressing modes such as TN (twisted nematic), STN (super twisted nematic), IPS (in-plane switching), VA (vertical alignment) and OCB (optically compensated birefringence) modes.

A TFT (thin film transistor) array 12 is formed on the inner face of the first transparent substrate 11, and a transparent electrode layer 13 made of, for example, ITO (indium tin oxide) is formed thereon.

An orientation layer 14 is formed on the transparent electrode layer 13. A polarizer 15 is formed on the outer surface of the transparent substrate 11.

On the other hand, a color filter 22 according to the present invention is formed on the inner face of the second transparent substrate 21. The red, green and blue filter segments constituting the color filter 22 are separated from one another by black matrices (not shown).

A transparent protective layer (not shown) is formed, if necessary, so as to cover the color filter 22, a transparent electrode layer 23 made of ITO for example is formed thereon, and an orientation layer 24 is formed so as to cover the transparent electrode layer 23.

A polarizer 25 is formed on the outer surface of the transparent substrate 21. A backlight unit 30 comprising the specified white LED 31 as a light source is provided under the polarizer 15.

The specified white LED 31 may be formed of a blue LED whose surface is coated with a phosphor filter or formed of the resin package of a blue LED in which a phosphor is incorporated, and as described above, the specified white LED 31 has spectral properties such that it has a wavelength ($\lambda 1$) with maximum emission intensity within the range of 430 nm to 485 nm and has a peak wavelength ($\lambda 2$) of a second emission intensity within the range of 530 nm to 580 nm wherein the ratio (I2/I1) of emission intensity (I2) at the wavelength ($\lambda 2$) to emission intensity (I1) at the wavelength ($\lambda 1$) is 0.2 to 0.7.

The blue LED is an LED which emits blue light (wavelength being 470 nm for instance) such as InGaN system or GaN system.

The phosphor absorbs a part of the blue light from the blue LED and emits a yellow light having a maximum emission at wavelengths within the range of 500 to 600 nm.

In the white LED in this system, a part of the blue light emitted by blue LED passes through the phosphor layer, and the remainder is absorbed onto the phosphor and converted into a yellow color.

A mixed light of the 2-color (blue and yellow) lights is recognized as white light by an observer. The phosphor which converts a blue light into a yellow light includes YAG (yttrium aluminum garnet).

Hereinafter, the present invention is described in more detail by reference to the Examples, but the present invention is not limited to the following examples and may be modified without departure from the gist of the invention. In the Examples and Comparative Examples, "parts" refers to "parts by weight".

Preparation of Acrylic Resin Solution 1

70.0 parts of cyclohexanone was charged into a separable 4-neck flask equipped with a thermometer, a condenser, a nitrogen gas-introducing tube, a dropping tube and a stirrer, and then heated to 80° C. Then, the atmosphere in the flask was replaced by nitrogen, and a mixture of 13.3 parts of n-butyl methacrylate, 4.6 parts of 2-hydroxyethyl methacrylate, 4.3 parts of methacrylic acid, 7.4 parts of p-cumylphenol ethylene oxide-modified acrylate ("Alonix M110" manufactured by Toagosei Co., Ltd.), and 0.4 part of 2,2'-azobisisobutyronitrile was added dropwise through the dropping tube over 2 hours.

After finishing the dropwise addition, the reaction was continued for 3 hours to afford a solution of an acrylic resin having a weight average molecular weight of about 26000 (solid content: 30% by weight).

After the resulting acrylic resin solution was cooled to room temperature, about 2 g of the resin solution was removed and dried under heating at 180° C. for 20 minutes, and the nonvolatiles were measured. Based on this measured value, cyclohexanone was added to the previously synthesized resin solution in such an amount that the content of the non-volatiles became 20%, thus preparing an acrylic resin solution 1.

Preparation of Treated Green Pigment 1

500 parts of phthalocyanine-based green pigment C.I. Pigment Green 36 ("Lionol Green 6YK" manufactured by Toyo Ink Mfg. Co., Ltd.), 500 parts of sodium chloride and 250 parts of diethylene glycol were charged into a 1-gallon stainless steel kneader (Inoue Seisakusho Co., Ltd.) and kneaded for 4 hours at 120° C.

Then, the kneaded material was charged into 5 L of hot water and then stirred for 1 hour under heating at 70° C. to afford a slurry. Then, the slurry was repeatedly filtered and washed with water to remove the sodium chloride and diethylene glycol. The resultant material was then dried for 1 day at 80° C. to afford 490 parts of treated green pigment 1 (G1).

Preparation of Treated Green Pigment 2

490 parts of treated green pigment 2 (G2) was obtained in the same manner as in preparation of the treated green pigment 1 except that phthalocyanine-based green pigment C.I. Pigment Green 7 ("Lionol Green YS-07" manufactured by Toyo Ink Mfg. Co., Ltd.) was used in place of the phthalocyanine-based green pigment C.I. Pigment Green 36.

Preparation of Treated Yellow Pigment 1

490 parts of treated yellow pigment 1 (Y1) was obtained in the same manner as in preparation of the treated green pigment 1 except that azo-based yellow pigment C.I. Pigment Yellow 150 ("E-4GN" manufactured by LANXESS.) was used in place of the phthalocyanine-based green pigment C.I. Pigment Green 36.

Preparation of Treated Yellow Pigment 2

490 parts of treated yellow pigment 2 (Y2) was obtained in the same manner as in preparation of the treated green pigment 1 except that isoindoline-based yellow pigment C.I. Pigment Yellow 185 ("PALIOTOL YELLOW D1155" manufactured by BASF) was used in place of the phthalocyanine-based green pigment C.I. Pigment Green 36, and the kneading time was changed from 4 hours to 8 hours.

Preparation of Treated Blue Pigment 1

200 parts of blue pigment C.I. Pigment Blue 15:6 ("Lionol Blue ES" manufactured by Toyo Ink Mfg. Co., Ltd.), 1600 parts of sodium chloride and 100 parts of diethylene glycol (Tokyo Kasei Co., Ltd.) were charged into a 1-gallon stainless steel kneader (Inoue Seisakusho Co., Ltd.) and kneaded for 12 hours at 70° C.

Then, the kneaded material was charged into about 5 L of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 198 parts of blue pigment 1 (B1).

Preparation of Treated Violet Pigment 1

200 parts of violet pigment C.I. Pigment Violet 23 ("LIONOGEN VIOLET RL" manufactured by Toyo Ink Mfg. Co., Ltd.), 1600 parts of sodium chloride and 100 parts of diethylene glycol (Tokyo Kasei Co., Ltd.) were charged into a 1-gallon stainless steel kneader (Inoue Seisakusho Co., Ltd.) and kneaded for 3 hours at 90° C.

Then, the kneaded material was charged into about 5 L of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 198 parts of violet pigment 1 (V1).

Preparation of Treated Red Pigment 1

160 parts of red pigment C.I. Pigment Red 254 ("IRGAZIN RED 2030" manufactured by Ciba Specialty Chemicals), 1600 parts of sodium chloride and 190 parts of diethylene glycol (Tokyo Kasei Co., Ltd.) were charged into a 1-gallon stainless steel kneader (Inoue Seisakusho Co., Ltd.) and kneaded for 10 hours at 60° C.

Then, the kneaded material was charged into about 5 L of hot water and then stirred for about 1 hour under heating at about 70° with a high-speed mixer to afford a slurry. This slurry was filtered and washed with water to remove the sodium chloride and diethylene glycol. The resultant material was then dried for 24 hours at 80° C. to afford 156 parts of red pigment 1 (R1).

Preparation of Treated Red Pigment 2

152 parts of red pigment C.I. Pigment Red 177 ("CROMOPHTAL RED A2B" manufactured by Ciba Specialty Chemicals), 8 parts of dispersant A-2 shown in Table 1, 1600 parts of sodium chloride and 190 parts of diethylene glycol (Tokyo Kasei Co., Ltd.) were charged into a 1-gallon stainless steel kneader (Inoue Seisakusho Co., Ltd.) and kneaded for 10 hours at 60° C.

Then, the kneaded material was charged into about 5 L of hot water and then stirred for about 1 hour under heating at about 70° C. with a high-speed mixer to afford a slurry. This slurry was filtered and washed with water to remove the sodium chloride and diethylene glycol. The resultant material was then dried for 24 hours at 80° C. to afford 156 parts of red pigment 2 (R2).

Preparation of Treated Red Pigment 3

500 parts of red pigment C.I. Pigment Red 179 ("Paliogen Marron L-3920" manufactured by BASF), 500 parts of sodium chloride and 250 parts of diethylene glycol were charged into a 1-gallon stainless steel kneader (Inoue Seisakusho Co., Ltd.) and kneaded for 8 hours at 120° C.

Then, the kneaded material was charged into 5 L of hot water and then stirred for 1 hour under heating at 70° C. to afford a slurry. This slurry was repeatedly filtered and washed with water to remove the sodium chloride and diethylene glycol. The resultant material was then dried for 1 day at 80° C. to afford 490 parts of red pigment 3 (R3).

Preparation of Each Colored Composition

First, pigment derivatives (A-1 to A-4) used in preparation of the respective colored compositions are shown below:

[Chem 1]

A-1:

Cu-cp: Copper phthalocyanine

A-2:

A3:

A-4:

A mixture of a pigment, a pigment derivative, an acrylic resin solution 1 and an organic solvent shown in Table 1 below was uniformly stirred and mixed, and then dispersed for 5 hours by means of Igar Mill ("Minimodel M-250 MKII" available from Igar Japan Co., Ltd.) using zirconia beads having a diameter of 1 mm.

Thereafter, 30.0 parts of cyclohexane was added thereto, and the resultant material was filtered through a 5 μm filter to prepare the respective pigment dispersions (green pigment dispersions GP-1 and SP-2, yellow pigment dispersions YP-1 and YP-2, blue pigment dispersion BP-1, violet pigment dispersion VP-1, and red pigment dispersions RP-1, RP-2 and RP-3).

TABLE 1

|  |  | Pigment dispersion | | | | | | | | |
|---|---|---|---|---|---|---|---|---|---|---|
|  |  | GP-1 | GP-2 | YP-1 | YP-2 | BP-1 | VP-1 | RP-1 | RP-2 | RP-3 |
|  |  | Pigment | | | | | | | | |
|  |  | G1 | G2 | Y1 | Y2 | B1 | V1 | R1 | R2 | R3 |
| Pigment derivative | | A-3 | A-3 | A-3 | A-3 | A-1 | A-1 | A-2 | A-4 | A-4 |
| Composition (parts) | Pigment | 12.6 | 12.6 | 6.4 | 6.4 | 10.8 | 10.8 | 10.8 | 10.8 | 10.8 |
|  | Pig. deriv. | 1.4 | 1.4 | 1.6 | 1.6 | 1.2 | 1.2 | 1.2 | 1.2 | 1.2 |
|  | Acrylic resin solution 1 | 30.0 | 30.0 | 60.0 | 60.0 | 40.0 | 40.0 | 40.0 | 40.0 | 40.0 |
|  | Organic solvent | 26.0 | 26.0 | 2.0 | 2.0 | 18.0 | 18.0 | 18.0 | 18.0 | 10.8 |
|  | Total | 70.0 | 70.0 | 70.0 | 70.0 | 70.0 | 70.0 | 70.0 | 70.0 | 70.0 |

Then, each of mixtures shown in Table 2 (red colored composition), in Table 3 (green colored composition) and in Table 4 (blue colored composition) was stirred, mixed uniformly and then filtered through a 1 μm filter to afford each colored composition (alkali development type resist material). "CGI OXE-01" manufactured by Ciba Specialty Chemicals was used as the photopolymerization initiator, and "Alonix M402" manufactured by Toagosei Co, Ltd. was used as pentaerythritol hexa- or penta-acrylate.

TABLE 2

| Red-colored Composition (Red resist) | | RR-1 | RR-2 | RR-3 | RR-4 | RR-5 | RR-6 |
|---|---|---|---|---|---|---|---|
| Composition (parts) | Pigment dispersion RP-1 (PR 254) | 64.8 | 32.4 | | | | 16.2 |
| | Pigment dispersion RP-2 (PR 177) | | 32.4 | 16.2 | 32.4 | 48.6 | 48.6 |
| | Pigment dispersion RP-3 (PR 179) | | | 48.6 | 32.4 | 16.2 | |
| | Acrylic resin solution 1 | 2.4 | 2.4 | 2.4 | 2.4 | 2.4 | 2.4 |
| | Pentaerythritol hexa- or penta-acrylate | 5.0 | 5.0 | 5.0 | 5.0 | 5.0 | 5.0 |
| | Photopolymerization initiator | 1.6 | 1.6 | 1.6 | 1.6 | 1.6 | 1.6 |
| | Methyl propyl acetate | 26.2 | 26.2 | 26.2 | 26.2 | 26.2 | 26.2 |
| | Total | 100.0 | 100.0 | 100.0 | 100.0 | 100.0 | 100.0 |

TABLE 3

| Green-colored composition (Green resist) | | GR-1 | GR-2 | GR-3 | GR-4 |
|---|---|---|---|---|---|
| Composition (parts) | Pigment dispersion GP-1 (PG 36) | 30.2 | 22.2 | 20.0 | 25.6 |
| | Pigment dispersion GP-2 (PG 7) | | 9.9 | 12.4 | 7.1 |
| | Pigment dispersion YP-1 (PY 150) | | 21.0 | 19.8 | 25.2 |
| | Pigment dispersion YP-2 (PY 185) | | 6.0 | 5.9 | |
| | Acrylic resin solution 1 | 3.3 | 4.3 | 5.0 | 5.2 |
| | Pentaerythritol hexa- or penta-acrylate | 4.9 | 4.9 | 4.9 | 4.9 |
| | Photopolymerization initiator | 2.4 | 2.4 | 2.4 | 2.4 |
| | Methyl propyl acetate | 29.5 | 29.5 | 29.5 | 29.5 |
| | Total | 100.0 | 100.0 | 100.0 | 100.0 |

TABLE 4

| Blue-colored composition (Blue resist) | | BR-1 | BR-2 | BR-3 | BR-4 |
|---|---|---|---|---|---|
| Composition (parts) | Pigment dispersion BP-1 (PB 15:6) | 52.3 | 44.0 | 33.0 | 22.0 |
| | Pigment dispersion VP-1 (PV 23) | 2.8 | 11.0 | 22.0 | 33.0 |
| | Acrylic resin solution 1 | 8.2 | 8.2 | 8.2 | 8.2 |
| | Pentaerythritol hexa- or penta-acrylate | 4.9 | 4.9 | 4.9 | 4.9 |
| | Photopolymerization initiator | 2.4 | 2.4 | 2.4 | 2.4 |
| | Methyl propyl acetate | 29.5 | 29.5 | 29.5 | 29.5 |
| | Total | 100.0 | 100.0 | 100.0 | 100.0 |

EXAMPLES 1 TO 14 AND COMPARATIVE EXAMPLES 1 TO 2

Preparation of Color Filter

A black matrix was formed by patterning on a glass substrate, and the substrate was coated via a spin coater with the red colored composition shown in Table 5 below, to form a film of the red colored composition.

Using an ultra-high pressure mercury lamp, ultraviolet rays of 300 mJ/cm$^2$ were irradiated via a photomask onto the film. Subsequently, the film was spray-developed with an alkaline developing solution consisting of 2 wt % sodium carbonate aqueous solution to remove the unexposed portions and then washed with deionized water. The resultant substrate was heated at 230° C. for 20 minutes, thereby forming a red filter segment having a film thickness shown in Table 7.

By the same procedures, the green colored composition shown in Table 5 was applied onto the substrate, irradiated via the photomask with ultraviolet rays, and then developed to form a green filter segment having a film thickness shown in Table 7 on the right side of the red filter segment.

By the same procedures, the blue colored composition shown in Table 5 was applied onto the substrate, Irradiated via the photomask with ultraviolet rays, and then developed to form a blue filter segment having a film thickness shown in Table 7 on the upper side of the red filter segment, to manufacture a color filter.

TABLE 5

| | Red-colored composition | Green-colored composition | Blue-colored composition |
|---|---|---|---|
| Comp. Ex. 1 | RR-1 | GR-1 | BR-1 |
| Ex. 1 | RR-2 | GR-2 | BR-2 |
| Ex. 2 | RR-3 | GR-2 | BR-2 |
| Ex. 3 | RR-4 | GR-2 | BR-2 |
| Ex. 4 | RR-5 | GR-2 | BR-2 |
| Ex. 5 | RR-6 | GR-2 | BR-2 |
| Ex. 6 | RR-2 | GR-3 | BR-2 |
| Ex. 7 | RR-2 | GR-2 | BR-3 |
| Ex. 8 | RR-2 | GR-4 | BR-2 |
| Comp. Ex. 2 | RR-1 | GR-1 | BR-1 |
| Ex. 9 | RR-4 | GR-3 | BR-3 |
| Ex. 10 | RR-3 | GR-3 | BR-3 |
| Ex. 11 | RR-5 | GR-3 | BR-3 |
| Ex. 12 | RR-4 | GR-2 | BR-3 |
| Ex. 13 | RR-4 | GR-3 | BR-4 |
| Ex. 14 | RR-4 | GR-4 | BR-3 |

<Measurement of Hue of Color Filter>

The color filters manufactured in Examples 1 to 14 and Comparative Example 1 to 2, when irradiated with the light from a white LED light source (NSPW 300BS available from Nichia Corporation; the emission spectrum of the light from this light source is as shown in table 1, and the wavelength ($\lambda 1$) at which the emission intensity becomes the maximum, the peak wavelength ($\lambda 2$) of the second emission intensity, and the emission intensity (I2) at the wavelength ($\lambda 2$) assuming that the emission intensity (I1) at the wavelength ($\lambda 1$) is 100, are shown in Table 6), were measured for their color properties by means of a microscopic spectrophotometer ("OSP-SP100" manufactured by Olympus Corporation).

The chromaticity points (x, y) of each color filter segment in the CIE color coordinate system, the NTSC ratio, the lightness in white display, and the color temperature are shown in Table 7.

The 50% transmittance wavelength and transmittance at 630 nm of the red filter segment, and the maximum transmittance wavelength and transmittance at 450 nm of the blue filter segment, are shown in Table 8.

TABLE 6

|  | λ1 | λ2 | I1 | I2 |
|---|---|---|---|---|
| Wavelength and Relative intensity | 460 nm | 565 nm | 100 | 38 |

TABLE 7

| Ex. No. | Red filter segment | | | Green filter segment | | | Blue filter segment | | | White display | | | NTSC ratio | Color temp. (K) | Thickness of filter segment (μm) | | |
|---|---|---|---|---|---|---|---|---|---|---|---|---|---|---|---|---|---|
|  | x | y | Y | x | y | Y | x | y | Y | x | y | Y |  |  | R | G | B |
| Comp. Ex. 1 | 0.640 | 0.352 | 20.7 | 0.304 | 0.610 | 48.3 | 0.137 | 0.053 | 4.7 | 0.326 | 0.326 | 24.6 | 73% | 5806 | 1.40 | 3.13 | 3.55 |
| Ex. 1 | 0.640 | 0.331 | 17.0 | 0.297 | 0.610 | 48.3 | 0.138 | 0.053 | 5.1 | 0.307 | 0.310 | 23.4 | 74% | 7045 | 1.55 | 1.79 | 1.72 |
| Ex. 2 | 0.640 | 0.341 | 13.7 | 0.297 | 0.610 | 48.3 | 0.138 | 0.053 | 5.1 | 0.290 | 0.311 | 22.4 | 74% | 8240 | 1.20 | 1.79 | 1.72 |
| Ex. 3 | 0.640 | 0.328 | 13.5 | 0.297 | 0.610 | 48.3 | 0.138 | 0.053 | 5.1 | 0.291 | 0.309 | 22.3 | 75% | 8205 | 1.40 | 1.79 | 1.72 |
| Ex. 4 | 0.640 | 0.317 | 13.0 | 0.297 | 0.610 | 48.3 | 0.138 | 0.053 | 5.1 | 0.291 | 0.307 | 22.1 | 75% | 8266 | 1.67 | 1.79 | 1.72 |
| Ex. 5 | 0.640 | 0.319 | 14.6 | 0.297 | 0.610 | 48.3 | 0.138 | 0.053 | 5.1 | 0.299 | 0.307 | 22.7 | 75% | 7665 | 1.89 | 1.79 | 1.72 |
| Ex. 6 | 0.640 | 0.331 | 17.0 | 0.292 | 0.610 | 46.8 | 0.138 | 0.053 | 5.1 | 0.305 | 0.307 | 23.0 | 75% | 7199 | 1.55 | 1.81 | 1.72 |
| Ex. 7 | 0.640 | 0.331 | 17.0 | 0.297 | 0.610 | 48.3 | 0.140 | 0.053 | 5.1 | 0.307 | 0.310 | 23.5 | 74% | 7031 | 1.55 | 1.79 | 1.29 |
| Ex. 8 | 0.640 | 0.331 | 17.0 | 0.292 | 0.610 | 46.4 | 0.138 | 0.053 | 5.1 | 0.306 | 0.306 | 22.8 | 75% | 7206 | 1.55 | 1.90 | 1.72 |
| Comp. Ex. 2 | 0.666 | 0.334 | 11.9 | 0.304 | 0.610 | 48.3 | 0.138 | 0.046 | 2.7 | 0.321 | 0.361 | 21.0 | 79% | 5966 | 5.23 | 3.13 | 5.58 |
| Ex. 9 | 0.666 | 0.323 | 11.1 | 0.292 | 0.610 | 46.8 | 0.141 | 0.046 | 3.7 | 0.296 | 0.321 | 20.5 | 80% | 7621 | 1.81 | 1.75 | 1.38 |
| Ex. 10 | 0.666 | 0.327 | 11.1 | 0.292 | 0.610 | 46.8 | 0.141 | 0.046 | 3.7 | 0.295 | 0.322 | 20.6 | 80% | 7661 | 1.61 | 1.75 | 1.38 |
| Ex. 11 | 0.666 | 0.318 | 11.3 | 0.292 | 0.610 | 46.8 | 0.141 | 0.046 | 3.7 | 0.297 | 0.321 | 20.6 | 81% | 7520 | 2.14 | 1.75 | 1.38 |
| Ex. 12 | 0.666 | 0.323 | 11.1 | 0.297 | 0.610 | 48.3 | 0.141 | 0.046 | 3.7 | 0.297 | 0.325 | 21.0 | 80% | 7437 | 1.79 | 1.79 | 1.38 |
| Ex. 13 | 0.666 | 0.323 | 11.1 | 0.292 | 0.610 | 46.8 | 0.146 | 0.046 | 3.7 | 0.297 | 0.320 | 20.6 | 80% | 7545 | 1.81 | 1.60 | 1.01 |
| Ex. 14 | 0.666 | 0.323 | 11.1 | 0.292 | 0.610 | 46.5 | 0.141 | 0.046 | 3.7 | 0.296 | 0.320 | 20.4 | 80% | 7634 | 1.79 | 1.90 | 1.38 |

TABLE 8

| Ex. No. | Red filter segment | | Blue filter segment | |
|---|---|---|---|---|
|  | 50% transmittance wavelength | Transmittance at 630 nm | Maximum transmittance wavelength | Transmittance at 450 nm |
| Comp. Ex. 1 | 585-590 nm | 96% | 460 nm | 64% |
| Ex. 1 | 595-600 nm | 96% | 445 nm | 68% |
| Ex. 2 | 600-605 nm | 88% | 445 nm | 68% |
| Ex. 3 | 600-605 nm | 89% | 445 nm | 68% |
| Ex. 4 | 600-605 nm | 91% | 445 nm | 68% |
| Ex. 5 | 595-600 nm | 95% | 445 nm | 68% |
| Ex. 6 | 595-600 nm | 96% | 445 nm | 68% |
| Ex. 7 | 595-600 nm | 96% | 445 nm | 68% |
| Ex. 8 | 595-600 nm | 96% | 445 nm | 68% |
| Comp. Ex. 2 | 595-600 nm | 90% | 460 nm | 52% |
| Ex. 9 | 605-610 nm | 87% | 445 nm | 62% |
| Ex. 10 | 605-610 nm | 85% | 445 nm | 62% |
| Ex. 11 | 600-605 nm | 89% | 445 nm | 62% |
| Ex. 12 | 605-610 nm | 87% | 445 nm | 62% |
| Ex. 13 | 605-610 nm | 87% | 440 nm | 60% |
| Ex. 14 | 605-610 nm | 87% | 445 nm | 62% |

The color temperature was higher where the color filters in Examples 1 to 8 wherein the NTSC ratio was about 75% had been used than where the color filter in Comparative Example 1 had been used. The NTSC ratio of 73% where the color filter in Comparative Example 1 had been used was almost the same as where the color filters in Examples 1 to 8 had been used, but in the Comparative Example 1, the color temperature was lower than 7000K, and the thickness of each of the green filter segment and the blue filter segment was greater than 3.0 μm.

The color temperature where the color filters in Examples 9 to 14 where the NTSC ratio was about 80% had been used was higher than where the color filter in Comparative Example 2 had been used. The NTSC ratio of 79% where the color filter in Comparative Example 2 had been used was almost the same as where the color filters in Examples 9 to 14 had been used, but in Comparative Example 2, the color temperature was lower than 7000K, and the thickness of each of the red filter segment, the green filter segment and the blue filter segment was greater than 3.0 μm.

As described above, the color filters of the present invention can be used to optimize the red, green and blue color reproducibility, white color reproducibility, color temperature and lightness (Y value), even when used in a liquid crystal display device using the specified white LED as a light source.

In addition, the color filters of the present invention can achieve an NTSC ratio of 72% or more and a color temperature of 7000K or more.

What is claimed is:

1. A color filter adapted to be used in a liquid crystal display device using, as a light source, a white LED having spectral properties such that it has a wavelength (λ1) at which an emission intensity becomes the highest, within a wavelength range of 430 nm to 485 nm and also has a peak wavelength (λ2) of a second emission intensity within a wavelength range of 530 nm to 580 nm, and a ratio (I2/I1) of an emission intensity I2 at the wavelength λ2 to an emission intensity I1 at the wavelength λ1 is 0.2 or more, but 0.7 or less, the color filter comprising a red filter segment, a green filter segment and a blue filter segment, on a substrate, wherein the red filter segment has a 50% transmittance wavelength within a range of 595 to 610 nm and a transmittance of 85% or more at a wavelength of 630 nm, the blue filter segment has a maximum transmittance wavelength of 455 nm or less and a transmittance of 55% or more at a wavelength of 450 nm, and a thickness of each of the red filter segment, the green filter segment and the blue filter segment is 3.0 μm or less, and wherein the red segment contains C.I. Pigment Red 177 and C.I. Pigment Red 179.

2. The color filter according to claim 1, wherein the chromaticity points of the red, green and blue segments in CIE colorimetric system are represented by (xR, yR), (xG, yG) and (xB, yB), respectively, and an area of a triangle defined by these three chromaticity points on the x-y chromaticity diagram is 72% or more of an area of a triangle defined by thee points of red (0.67, 0.33), green (0.21, 0.71) and blue (0.14, 0.08), and the color filter exhibits a color temperature of 7000K or more.

3. The color filter according to claim 1, wherein the blue filter segment contains C.I. Pigment Blue 15:6 and C.I. Pigment Violet 23, and a weight ratio of C.I. Pigment Blue 15:6/C.I. Pigment Violet 23 is 85/15 to 40/60.

4. The color filter according to claim 1, wherein the green filter segment contains at least three pigments selected from the group consisting of C.I. Pigment Green 36, C.I. Pigment Green 7, C.I. Pigment Yellow 150 and C.I. Pigment Yellow 185.

5. The color filter according to claim 1, wherein:
the blue filter segment contains C.I. Pigment Blue 15:6 and C.I. Pigment Violet 23, wherein a weight ratio of C.I. Pigment Blue 15:6/C.I. Pigment Violet 23 is 85/15 to 40/60; and
the green filter segment contains at least three pigments selected from the group consisting of C.I. Pigment Green 36, C.I. Pigment Green 7, C.I. Pigment Yellow 150 and C.I. Pigment Yellow 185.

6. A liquid crystal display device comprising a color filter according to claim 1, and a white LED having spectral properties such that it has a wavelength ($\lambda 1$) at which an emission intensity becomes the highest, within a wavelength range of 430 nm to 485 nm and also has a peak wavelength ($\lambda 2$) of a second emission intensity within a wavelength range of 530 nm to 580 nm, and a ratio (I2/I1) of an emission intensity I2 at the wavelength $\lambda 2$ to an emission intensity I1 at the wavelength $\lambda 1$ is 0.2 or more, but 0.7 or less.

* * * * *